N. WYLLYS.
MOTION FOR POWER LOOMS.
No. 19,664.　　　　　　　　　Patented Mar. 16, 1858.
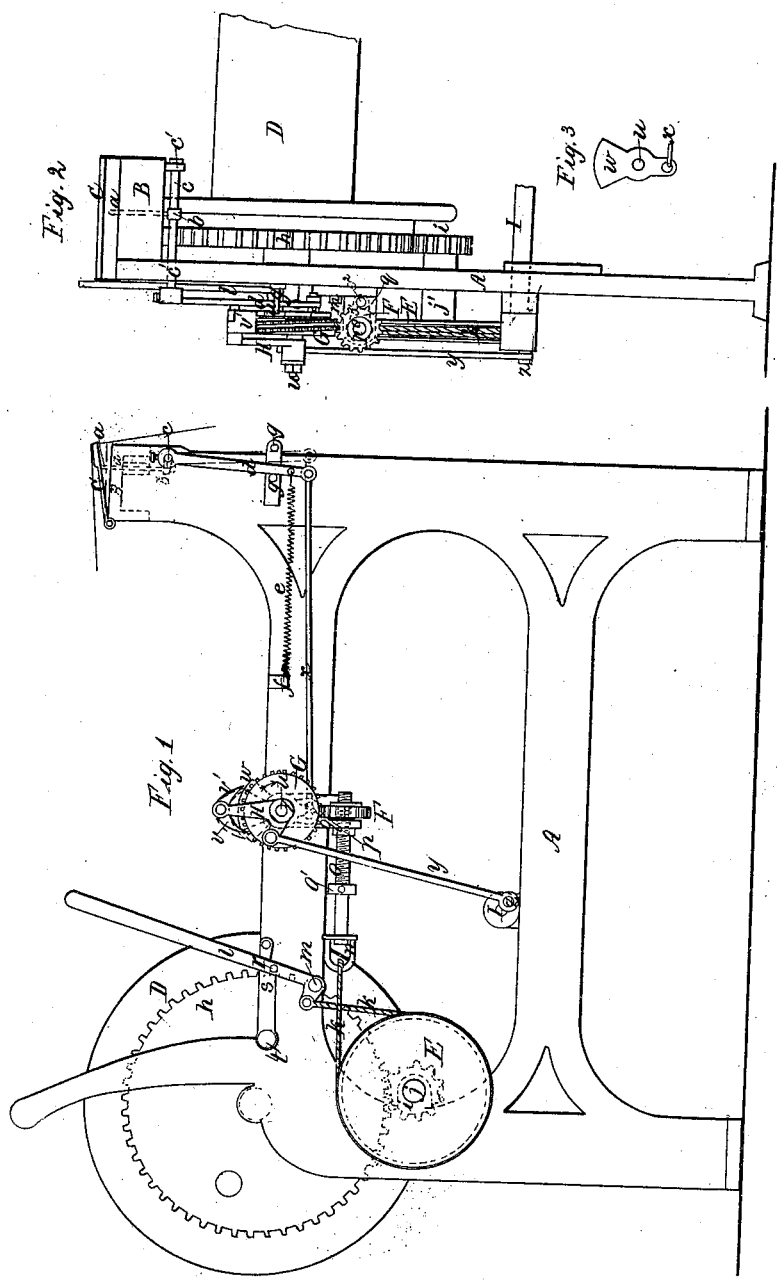

UNITED STATES PATENT OFFICE.

NEWELL WYLLYS, OF SOUTH GLASTONBURY, CONNECTICUT, ASSIGNOR TO HIMSELF, AND CHARLES COLLINS, OF HARTFORD, CONNECTICUT.

LET-OFF MOTION FOR POWER-LOOMS.

Specification of Letters Patent No. 19,664, dated March 16, 1858.

*To all whom it may concern:*

Be it known that I, NEWELL WYLLYS, of South Glastonbury, in the county of Hartford and State of Connecticut, have invented a new and Improved Let-Off Motion for Power-Looms; and I do hereby declare that the following is a full, clear, and exact description of the same, reference being had to the accompanying drawings, forming part of this specification, in which—

Fig. 1 is a side view of a sufficient portion of a loom to illustrate the application of my invention. Fig. 2 is a front view of the same. Fig. 3 is a detail view.

Similar letters of reference denote the same parts in all the figures.

This invention consists in certain mechanism whereby the letting off of the warp yarn from the yarn-beam is properly controlled by the pressure of the cloth upon the breast-beam of the loom.

To enable others to make and use my invention, I will proceed to describe its construction and operation.

A, is one of the side frames of the loom. B is the breast-beam having its top side or face fitted with and covered by a movable cap C, consisting of a plate of metal or strong slab of wood, the back edge of said cap being hinged to the back of the breast-beam, and the front edge of said cap being parallel with and extending to or slightly beyond the front of the breast-beam. This cap C rests upon one or more upright pins $a$, which work freely through the breast-beam B, and are supported by one or more toes $b$, attached to a small shaft $c$, which is arranged to work in fixed bearings $c'$, $c'$, below and parallel with the breast-beam, and said shaft projects through the side frame A, and carries outside of the frame an arm $d$, which is connected by a spring $e$, with a stationary pin $f$, secured in the frame A, the effect of which spring is to draw back the aforesaid arm $d$, and raise the toe or toes $b$, and by that means to lift the pin or pins $a$, and cap C, of the breast-beam. The play of the arm $d$, is limited by two pins $g$, $g$, secured in the frame A.

D, is the yarn-beam, carrying a spur gear $h$, which gears with a pinion $i$, on a short shaft $j$, which works in a box $j'$, attached to the frame A, and which carries, outside the frame a friction wheel E, round which a friction band $k$, is wound once or more times to serve as a brake to the yard-beam. One end of this friction band is attached to a lever $l$, which works on a fulcrum $m$, secured in the frame A, and the other end is connected by a swivel $n$, with a screw $o$, which is fitted to put a nut $p$, which is fitted to turn freely in a plate $q$, which is bolted to the frame A. The screw and nut serve to tighten the band. The lever $l$, is locked by a pin $r$, which it carries, being caught by a pawl $s$, which works on a stationary pin $t$, outside the frame A, and is thus caused to hold the friction band securely at one end while its other end, connected to the screw $o$, is held by a shoulder on the nut $p$, bearing against the plate $q$. The screw $o$, is prevented turning by a fork $o'$, which is secured to it and which slides along a guide rod $o^2$. The nut $p$, is furnished with a worm gear F, which gears with an endless screw G, which is fitted to turn on a stud $u$, secured in the frame A, and to this stud is also fitted a small elbow lever H, one arm of which carries two pawls $v$, $v'$, which set opposite ways and which work in notches that are cut across the thread of the endless screw G, so as to make it constitute an endless screw and spur wheel also. The other arm of the elbow lever is connected by a rod $y$, with an eccentric wrist pin $z$, attached to the cam shaft I, of the loom and by that means the lever is caused to receive a motion which moves the pawl back and forth over the wheel G. The stud, $u$, has also fitted to it a sector-shape plate $w$, of which a side view is given detached in Fig. 3, which plate works close to the inner side of the spur gear and whose arc projects slightly above the tops of the threads or teeth of G; and the pawls $v$, $v'$, are made broad enough to extend beyond G, and over the sector plate $w$. This sector plate $w$, is connected by a rod $x$, with the end of the arm $d$.

The operation of the let-off motion is as follows:—The strength of the spring $e$, by which the cap C, of the breast-beam is held up, is first so adjusted that the tension of the cloth when just right will produce such a degree of pressure on the cap C, as to cause the depression of the said cap so far that by its action through the pins $a$, $a$, upon the toes $b$, $b$, of the shaft $c$, the arm D, and rod $x$, will be caused to hold the sector plate $w$, in such a position that the pawls in moving back and forth over the periphery of the wheel G, will be supported throughout the whole length of their movement upon the arc of the sector plate, which arc is just long enough for this purpose, and thus be prevented entering the notches in G, and be caused to leave said wheel stationary. The spring being thus adjusted, the friction of the band K, will not be varied so long as the tension of the warp does not vary, as the nut $q$, cannot be moved without the thread of G, turns in the worm wheel; but so soon as the tension of the warp varies in the least degree the pressure of the cloth on the cap C, is increased or diminished, and the cap is either more depressed, or else elevated by the action of the spring $e$. In the first case the arm $d$, is caused to be thrown forward as shown in red outline in Fig. 1, and by that means the sector plate $w$, or at least the arc of the said plate is moved back, and the front pawl $v'$, allowed to fall in gear with G, and turn it in the direction of the arrow shown on it in Fig. 1, thus causing it by its action on the worm wheel F, to turn the nut $p$, in a direction to slacken the friction band $k$, and reduce the drag upon the yarn beam; but in the other case, the arm $d$, is thrown back and the arc of the plate $w$, moved forward so as to allow the pawl $v$, to come into action, which causes the endless screw wheel G, to turn the nut $p$, in a direction to tighten the friction band and increase the drag upon the yarn beam. The letting-off of the warp yarn is thus controlled by the friction of the band $k$, which it will be understood is controlled entirely by the pressure of the cloth on the breast-beam, which pressure varies with the slightest variation of the tension of the warp, and consequently any variation from the proper tension will be at once corrected.

I will remark that the end of the friction band which is attached to the lever $l$, might be attached to any fixture on the loom; but by the attachment to the lever as described, provision is made for instantly slackening it when required for the repair of the warp or for any other purpose, as by raising the pawls $s$, the lever is unlocked and the band slackened. The band or brake, instead of being applied to a separate wheel, may be applied directly to the yarn beam. I will also state that, instead of cutting teeth across the thread of the endless screw G, for the pawls to work in, the said screw may have a toothed wheel attached to one side of it, for the purpose of receiving the pawls. I will further state that the cap C, may be made movable in various ways to act as described; and, in fact, the entire breast-beam may be made movable substantially like the cap C, and making it so would be equivalent to furnishing it with a movable cap.

What I claim as my invention and desire to secure by Letters Patent, is:—

1. The employment of a movable cap C, or its equivalent, as the bearing surface for the cloth on the breast beam of the loom, for the purpose of controlling the letting-off the warp yarn from the yarn beam by the pressure of the cloth on the breast beam, substantially as herein described.

2. In combination with the movable cap C, of the breast beam, or its equivalent, and a friction wheel and friction band applied to the yarn beam, I claim the train of mechanism herein described, through which the said movable cap or its equivalent operates to control the tension of the friction band for the purpose of controlling the tension of the warp yarn.

NEWELL WYLLYS.

Witnesses:
 AARON W. KINNE,
 MARTIN HOLLISTER.